Dec. 15, 1970   J. R. McWHIRTER   3,547,815
STAGED OXYGENATION OF BOD-CONTAINING WATER
Filed July 2, 1969   7 Sheets-Sheet 1
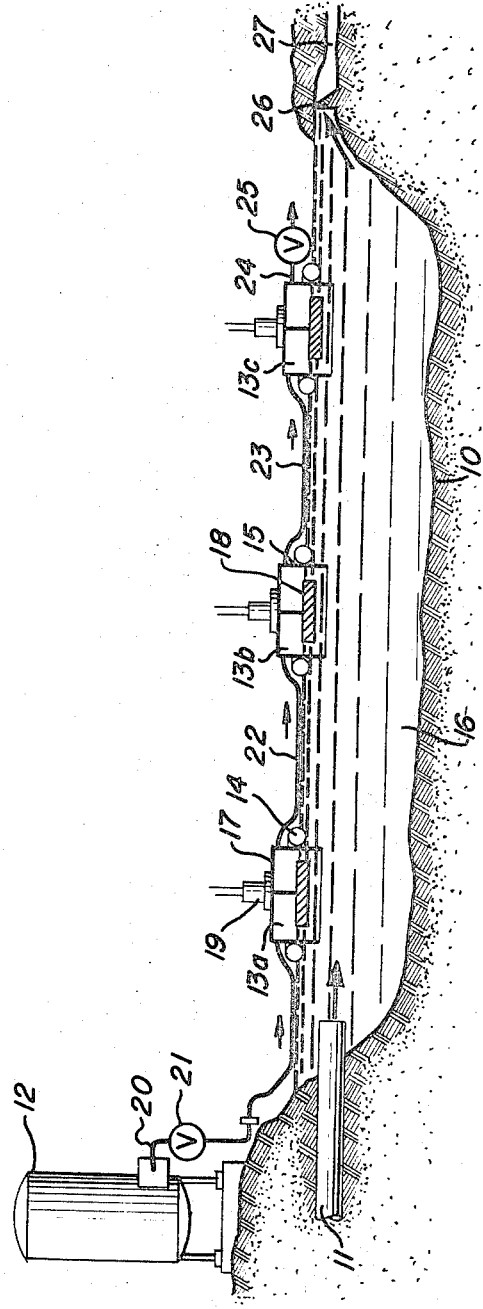
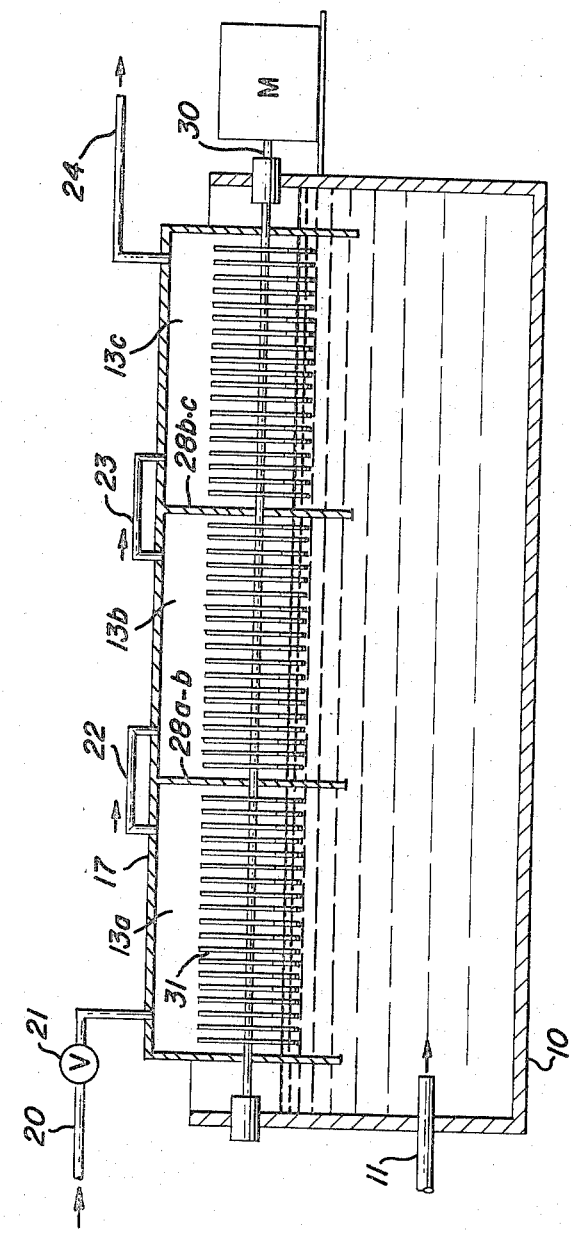
INVENTOR
John R. McWhirter
BY
ATTORNEY

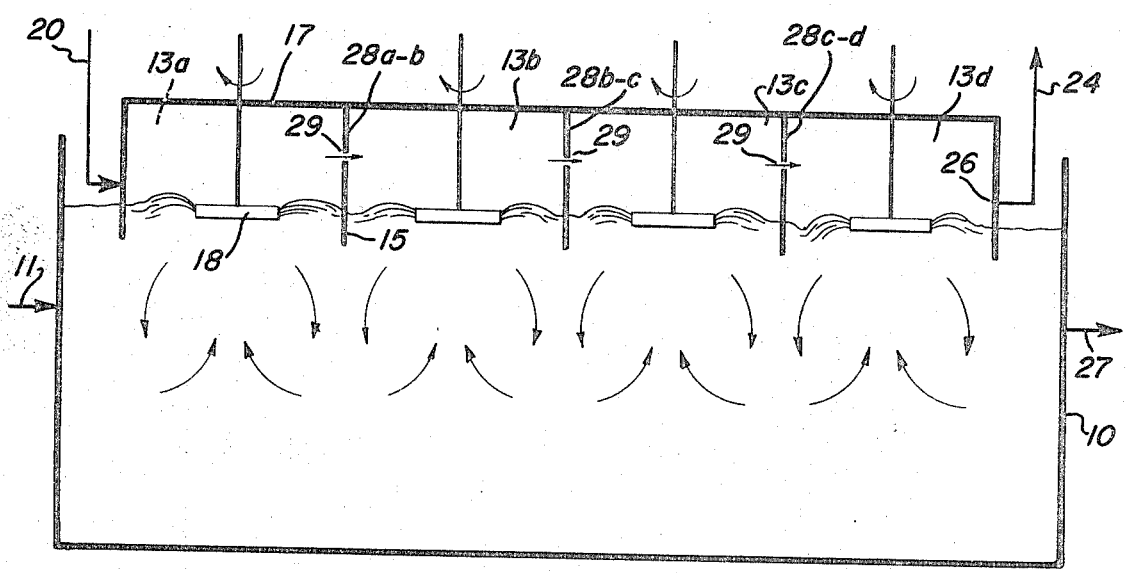
FIG. 2.
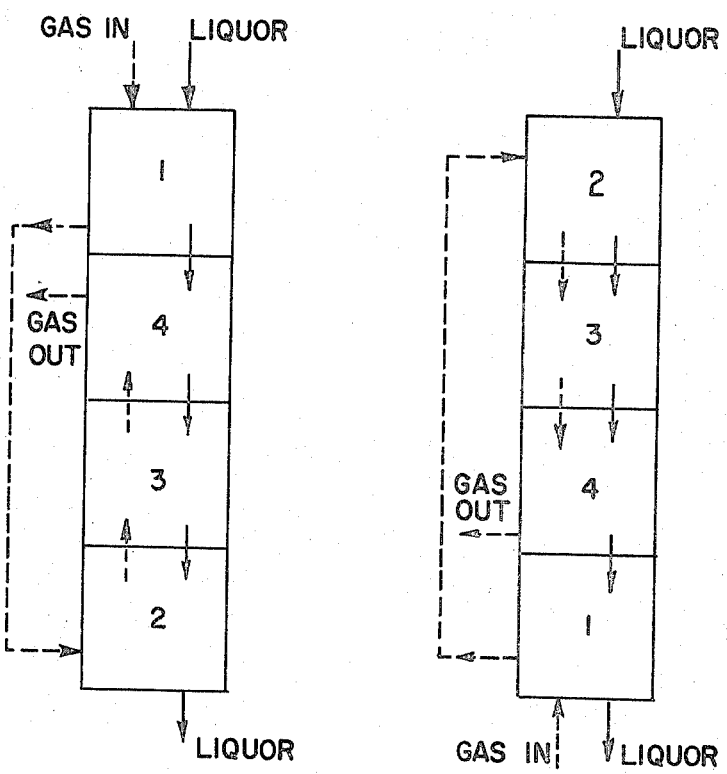
FIG. 9.
FIG. 10.
INVENTOR
John R. McWhirter
BY John C. LeDeve
ATTORNEY

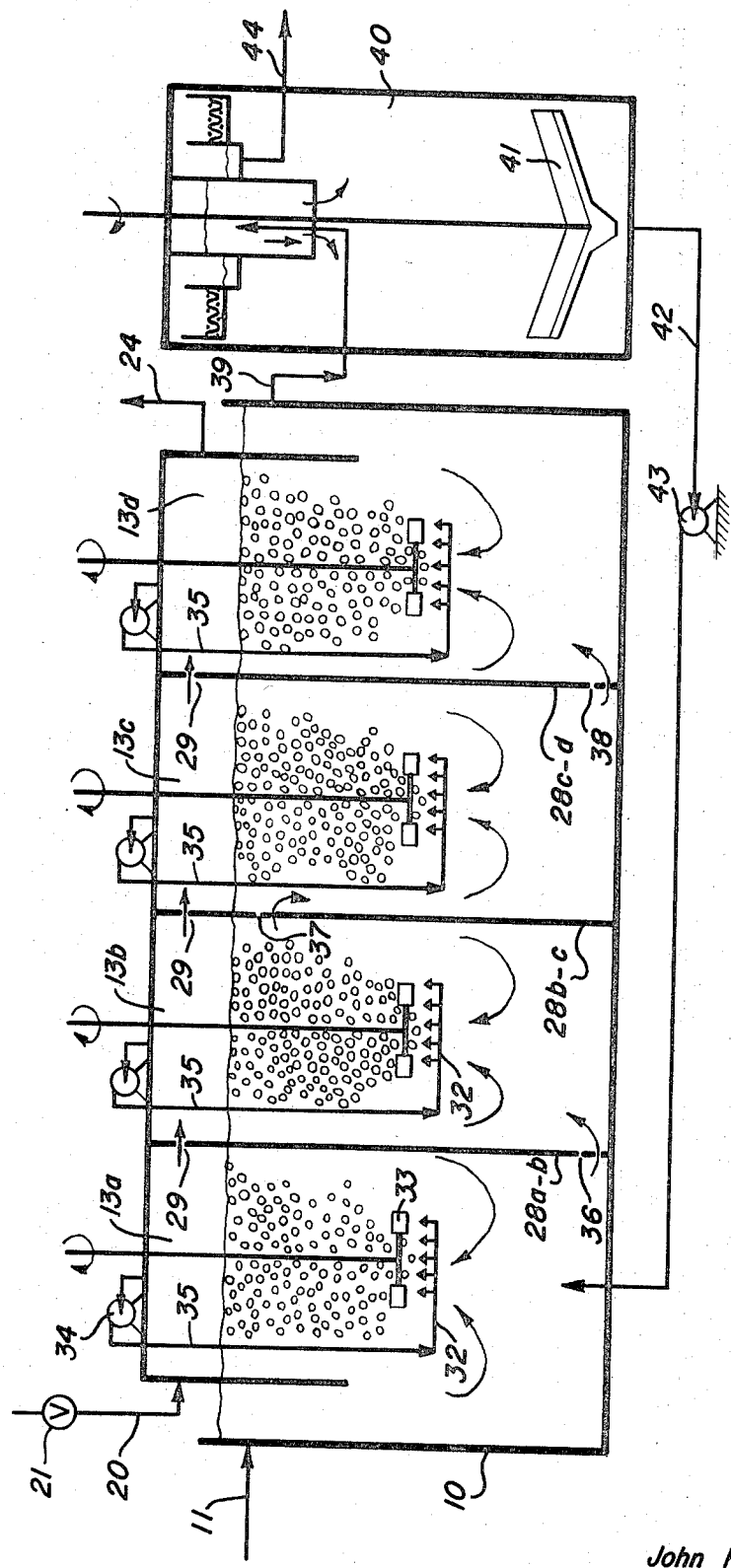

3,547,815
STAGED OXYGENATION OF BOD-CONTAINING
WATER
John R. McWhirter, Williamsville, N.Y., assignor to Union
Carbide Corporation, New York, N.Y., a corporation
of New York
Filed July 2, 1969, Ser. No. 838,500
Int. Cl. C02c 1/10
U.S. Cl. 210—7                                    25 Claims

ABSTRACT OF THE DISCLOSURE

BOD-containing water such as sewage is mixed with oxygen gas and active biomass in a first stage to produce oxygenated liquid-solid and first unconsumed oxygen-containing gas. The latter is withdrawn and mixed with BOD-containing water in a second oxygenation stage.

CROSS-REFERENCES TO RELATED APPLICATIONS

The following applications relating to oxygenation of BOD-containing water were filed simultaneously with this application:

Ser. No. 838,442, Cyclic Oxygenation of BOD-containing Water, J. R. McWhirter; Ser. No. 838,467, High Oxygen Utilization In BOD-Containing Water Treatment, J. R. McWhirter; Ser. No. 838,498, Biochemical Oxidation With Low Sludge Recycle, E. K. Robinson and J. R. McWhirter; Ser. No. 838,499, Bio-Oxidation With Low Sludge Yield, J. R. McWhirter.

BACKGROUND OF THE INVENTION

This invention relates to a method of and apparatus for biochemically treating BOD-containing water by oxygenation. The BOD-containing water may for example be municipal sewage, chemical waste from petrochemical or paper plants, or fermentation liquor.

With few exceptions, biological oxidation methods have employed air as the large oxygen source. The quantity of air required to supply oxygen is primarily due to the 4/1 dilution with nitrogen, and typically only 5–10% of the oxygen is absorbed due to the low oxygen mass transfer efficiency of the method. However, the air was "free" and the large amount of energy supplied to the air was normally sufficient to mix and suspend the bacterial solids (active biomass) in the liquid.

The direct use of oxygen instead of air in treatment of municipal and chemical wastes has been considered for many years because of its potential advantages in reducing the quantity of required gas. Moreover, it has been speculated that the rate and completness of such biochemical reactions are suppressed by low dissolved oxygen (DO) levels. Because of the additional cost of oxygen, it must be used sparingly and effectively. This necessitates a small volumetric ratio of gas-to-liquid as compared to air aeration. Also, the partial pressure of oxygen in the aerating gas must be sustained at high level to achieve economies in the cost and operation of aeration equipment while still obtaining high rates of oxygen dissolution. The prior art has not discovered a method which maintains high oxygen partial pressure in aeration while simultaneously utilizing a high percentage of the oxygen contained in the valuable gas. Conventional air aeration techniques do not satisfy these requirements.

Other conventional gas-liquid contacting techniques such as packed or plate-type columns, sparged columns, or agitated gas-liquid columns which are commonly employed in chemical processing are not well suited for this particular purpose. Although these systems can be designed to achieve a high percentage oxygen absorption, they are not readily adapted to the handling of mixed liquid-solid suspensions such as encountered in the activated sludge process for waste water treatment. Neither are the conventional systems suited for contacting large volumes of liquid and small volumes of gas with high rates of dissolution and with low energy consumption.

The achievement of both high oxygen utilization and high oxygen partial pressure in biological oxidation is further complicated by the evolution of diluent gases from the mixed liquor undergoing aeration. Usually the BOD-containing feed water to the process is nitrogen-saturated with respect to air. While mass transfer of nitrogen is not a consideration when air aeration is employed, it becomes a very significant factor when the nitrogen content of the aeration gas is reduced and the volume of aeration gas becomes small. This is become the dissolved nitrogen will be stripped from the liquid into the gas and will reduce the oxygen partial pressure of the gas. Other gases evolved from the liquid which are inert to the biochemical reaction will have a similar effect, e.g., argon and moisture. Carbon dioxide, which is a product of the oxidation, will also evolve in substantial quantity and further suppress the oxygen partial pressure.

If an oxygen-enriched aeration gas is utilized effectively, then its volume relative to air will be very low, e.g., 1/90. While this offers opportunities for cost savings in gas compression, it aggravates the problems of liquid mixing and of oxygen dilution with impurities. The total energy input to the small quantity of gas for purposes of oxygen solution may now be far less than that required for suspending and mixing the solids in the liquid. The inert gases evolved from the liquid will also impair the oxygen partial pressure to a greater extent as the quantity of aeration gas is reduced.

It is an object of this invention to provide an improved system for biochemically treating BOD-containing water for disposal by high purity oxygen gas.

Another object is to provide a system characterized by high rate of oxygen transfer to the BOD-containing water per unit of energy input, which represents a substantially higher energy transfer efficiency as compared to conventional atmospheric air aeration techniuqes.

Still another object is to provide a system for oxygenation of BOD-containing water characterized by high oxygen partial pressure and high oxygen utilization efficiency.

Other objects and advantages of this invention will be apparent from the ensuing disclosure and appended claims.

SUMMARY

This invention relates to a method of and apparatus for treatini BOD-containing water by oxygenation in contact with active biomass.

In one method aspect, liquor, i.e., BOD-containing water and active biomass, and feed gas comprising at least 50% oxygen (by volume) are mixed and one of such fluids is simultaneously continuously recirculated against the other fluids in a first gaseous oxygenation stage to form first oxygenated liquid-solid or liquor consumed and also form in the first oxygenation stage, first unconsumed oxygen-containing gas comprising at least 35% oxygen. The latter gas is discharged from the first stage and mixed and one of such fluids is simultaneously continuously recirculated against the other fluids with liquid-solid in at least a second gaseous oxygenation stage to form at least a second oxygenated liquid-solid (liquor) and second unconsumed oxygen-containing gas of lower oxygen purity than the first gas. The last-mentioned gas is discharged from the second stage and either released to the atmosphere, further processed for example to recover or use its oxygen content, or mixed with liquid-solid in another oxygenation stage if such be employed. Any such further oxygenation stages are operated in a manner analogous to the already described second stage, that is, unconsumed oxygen-containing gas from the previous oxygenation stage is flowed to the next higher stage for mixing with liquid-solid therein and one of such fluids is simultaneously continuously recirculated against the other fluids for oxygen absorption and reaction with the latter's food content (BOD).

In this method, the fluid streams are flow-regulated and the mixing and gas-liquid contact energy input to the first and succeeding stages is regulated such that (a) at least 60% (by volume) of the oxygen in the feed gas is consumed in the liquid-solid of all stages; (b) between 0.06 and 0.40 lb.-moles per hour of oxygen are introduced to the first stage per one horsepower of mixing energy used in all stages; and (c) the gas discharged from the final gaseous oxygenation stage wherein unconsumed oxygen gas from the preceding stage has been contacted with waste liquid-solid, comprises more than 21% and less than 80% oxygen. In a preferred embodiment, the volumetric flow ratio of feed gas to liquid in the first stage is between 0.08 and 2.0.

In another method embodiment, waste liquor, activated sludge and feed gas comprising at least 50% oxygen are mixed in a first gaseous oxygenation stage and one of these fluids is simultaneously continuously recirculated against the other fluids to form first oxygenated liquid-solid having volatile suspended solids content (MLVSS) of at least 3000 p.p.m. and first unconsumed oxygen-containing gas comprising at least 35% oxygen. The first unconsumed oxygen-containing gas and first oxygenated liquid-solid are discharged from the first stage at flow-restricted rates and mechanically mixed in at least a second gaseous oxygenation stage while simultaneously recirculating one of such fluids against the other to form a second oxygenated liquid-solid having volatile suspended solids content of at least 3000 p.p.m., and second unconsumed oxygen-containing gas comprising more than 21% oxygen. Oxygenated liquid-solid from a higher-than-first gaseous oxygenation stage is separated into purified liquid and activated sludge, and at least part of the activated sludge is recycled to the first gaseous oxygenation stage. In this embodiment each stage produces oxygenated liquid-solid of lower food content (BOD) than the immediately preceding stage and the oxygen purity of the unconsumed gas discharged therefrom is lower than that of the oxygen-containing gas introduced for mixing, and at least 60% (by volume) of the oxygen in the feed gas is consumed in the liquid-solid of all stages.

One apparatus embodiment of the invention includes a BOD-containing water storage enclosure, an oxygen gas source for supplying feed gas comprising at least 50% oxygen (by volume), and at least two separate oxygenation chambers within the storage enclosure each having walls with lower ends extending substantially to the floor of the storage enclosure and upper ends of the same or different walls extending above the waste liquor level. Covers are provided over the wall upper ends to form gas spaces. Conduit means are provided between the oxygen gas source and one of the oxygenation chambers, along with means for mechanically mixing the oxygen gas with BOD-containing water within the one oxygenation chamber to form first oxygenated liquid-solid. Separate means are provided for continuously recirculating a fluid in the one oxygenation chamber against other fluids therein. The apparatus also includes restricted passageway means for flow of unconsumed oxygen-containing gas from the gas space of the one oxygenation chamber to a second oxygenation chamber, and restricted flow means for transferring the first oxygenated liquid-solid from the one chamber to the second chamber. Means are provided for mechanically mixing the unconsumed oxygen-containing gas and first oxygenated liquid-solid within the second oxygenation chamber to form second oxygenated liquid-solid. Separate means are also provided for continuously recirculating a fluid into the second chamber against the other fluids therein.

The method and apparatus of this invention has been successfully used to treat municipal sewage in a manner significantly more efficient than the widely used air aeration treatment or could be achieved in a single step gaseous oxygenation treatment. The term "waste liquor" as used herein includes any liquid-solid waste of domestic or industrial origin which is polluted with organic matter (with or without inorganic substances) which can be bio-oxidized in water with oxygen gas.

BRIEF DESCRIPTION OF THE DRAWINGS

FIG. 1 is a schematic view taken in cross-sectional elevation of apparatus according to one embodiment of the invention in which multiple oxygenators float in a large body of waste liquor;

FIG. 2 is a schematic view taken in cross-sectional elevation of another embodiment characterized by common wall partitions between the oxygenation stages and a common cover thereover;

FIG. 3 is a schematic view taken in cross-sectional elevation of still another embodiment characterized by brush-type mixers;

FIG. 4 is a schematic view taken in cross-sectional elevation of a further embodiment characterized by submerged turbine-type mixers, series flow of oxygenated liquid-solid from stage-to-stage in a direction cocurrent to the unconsumed oxygen gas, a clarifier, and return of activated sludge to the first state.

FIG. 9 is a schematic flow diagram of a four stage embodiment wherein the BOD level and oxygen purity declines throught two stages with intervening stages wherein the oxygen gas and liquid-solid flow countercurrently; and FIG. 10 is a schematic flow diagram of another four stage embodiment wherein the flows are countercurrent in the first oxygen gas stage and cocurrent in the remaining stages.

DESCRIPTION OF THE PREFERRED EMBODIMENTS

Figure 5:
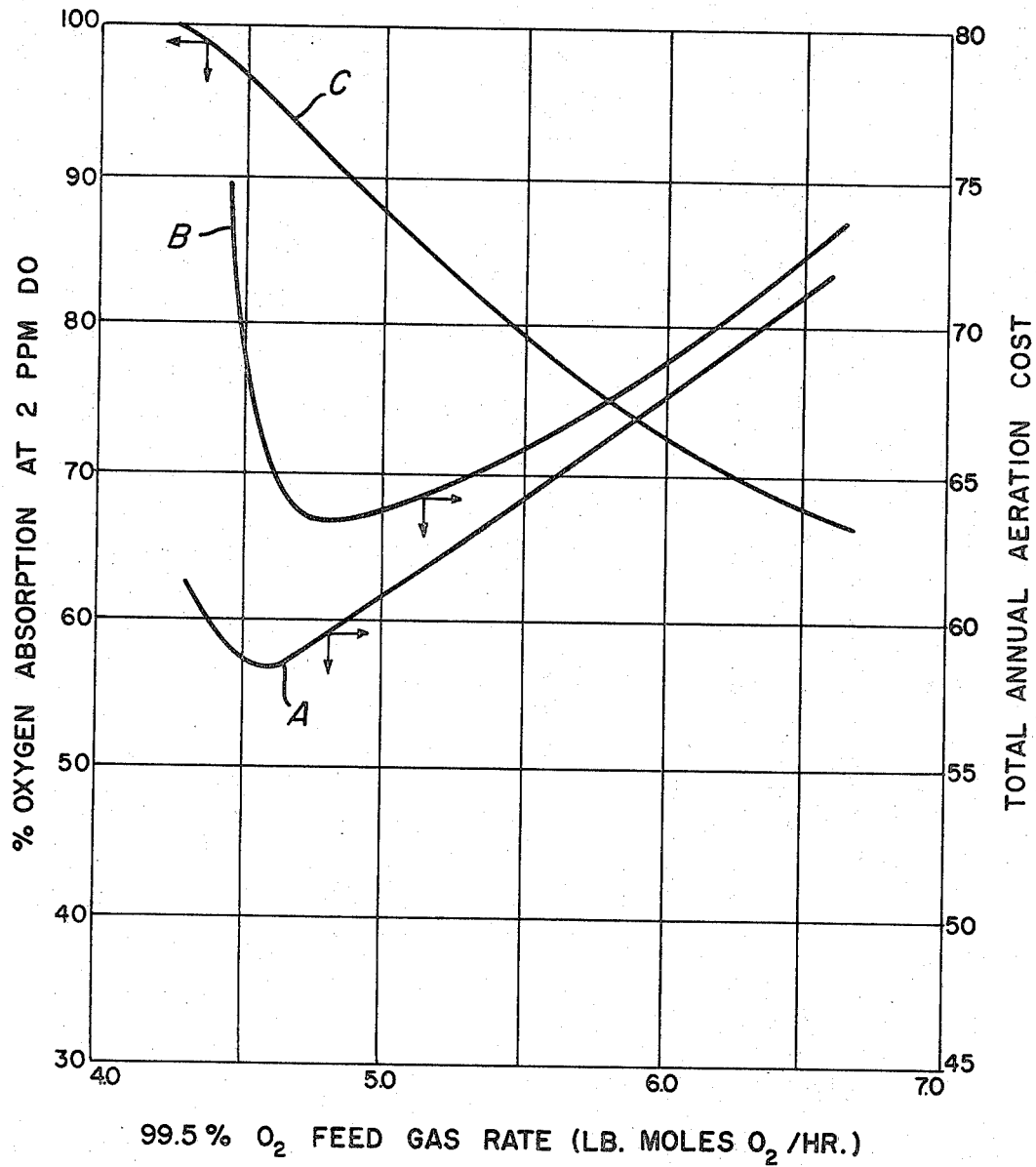
FIG. 5 is a performance comparison graph for concurrent versus countercurrent flow of oxygen gas and liquid-solid in a six stage waste treatment system employing 99.5% oxygen feed gas and wherein a 2 p.p.m. DO level is maintained.

Referring now to the drawings, FIG. 1 shows a waste liquor storage enclosure 10 which may be a fabricated tank but in this embodiment is a naturally formed fluid enclosure as for example a lagoon. Waste liquor enters enclosure 10 through conduit 11, and an oxygen gas source as for example container 12 is provided nearby. The oxygen may be stored in liquid form or as pressurized gas.

At least two separate oxygenation chambers float in lagoon 10, and in FIG. 1 three chambers 13a, 13b and 13c are illustrated and supported by floatation collars 14.

Oxygenation chambers 13a, 13b and 13c have walls 15 with lower ends extending below the level of waste liquor 16 and upper ends supporting gas-tight covers 17. Means for mixing oxygen gas and waste liquor are provided in each chamber and may for example comprise rotating surface type impellers 18 usually powered by electric motors 19. The manner in which power is used in each oxygenation stage is highly important in the practice of this invention. Two functions must be provided: The solids must be held in suspension in the liquid, and the oxygen gas and liquor must be contacted intimately. In many previous systems using air, the two functions were served by the air alone. The air volume was large, as required to provide the necessary oxygen from a gas highly diluted with nitrogen, and the stirring action of the gas on the liquor, while inefficient, was adequate to hold the solids in suspension.

In this efficient oxygen aeration system the quantity of gas needed to supply the oxygen is much smaller and does not provide the mixing action needed to suspend the solids, especially when solids loadings are high. The energy needed for stirring the liquor is preferably supplied by a mechanical agitator or propeller which is considerably more efficient in this respect than gas bubbling. The stirrer may be a different device from the gas-liquor contactor, as for example, a submerged propeller in conjunction with an additional gas sparger. Optionally, the two functions may be served by the same device but, in either event, the device should be of a type which sustains a high oxygen partial pressure differential across the gas-liquor interfacial area generated by the device.

In most stages, the energy required for gas-liquid contact is substantially less than the energy required by the solid-liquid suspension. The gas-liquid contact energy is nevertheless significant, and unless the contacting method is properly chosen, the power consumption for this function can become excessive. Moreover, the DO level and oxygen utilization may suffer. A device should be chosen which generates a large amount of interfacial area between gas and liquor, yet which does not produce a fine dispersion of liquor in the gas. Considerable power is required to produce fine liquid dispersions and such dispersions represent relatively inefficient mass transfer for this system. Suitable mixing devices produce a large contact area in a large volume of liquid, such that the liquid adjacent the interfacial area does not approach saturation. The oxygen partial pressure driving forces for rapid solution are therefore sustained, and mixing losses are reduced when the liquid in the contacting zone returns to the main pool. Satisfactory mixing device include spargers which produce fine bubbles in the liquid pool and surface aerators which throw relatively massive sheets or streams of liquid into the gas.

Aerating devices are commonly rated by the so-called "air standard transfer efficiency" which identifies the capability of the device to dissolve oxygen from air into zero-DO tap water at one atmosphere pressure and 20° C. Suitable devices are those which have an air standard transfer efficiency of at least 1.5 lb. $O_2$/HP-hr. For these purposes, the power used in rating the device is the total power consumed both for agitating the liquor and for gas-liquor contacting.

Conduit 20 with control valve 21 therein is provided between oxygen container 12 ane one oxygenation chamber 13a, and gas comprising at least 50% oxygen flows therethrough to chamber 13a for mixing with waste liquor to form first oxygenated liquid-solid. In this embodiment activated sludge is circulated within the lagoon by natural flow and impellers 18, and a portion thereof is contacted by the impeller of first chamber 13a. Part of this sludge gravity settles to the lagoon floor and may be periodically removed therefrom by dredging means. Depending on the relative positioning of the waste liquor feed conduit 11 and first oxygenator 13a, the waste liquor-activated sludge mixing may and in fact usually does occur prior to contact with oxygen-containing gas in the first oxygenation stage.

Restricted passageway means 22 communicates between first chamber 13a gas space and the second chamber 13b gas space, and facilitates flow of unconsumed oxygen-containing gas from the former to the latter. In this particular embodiment, means 22 may be in the form of floating tubing. The unconsumed oxygen-containing gas entering second chamber 13b (of lower oxygen purity than the gas entering first chamber 13a) is mixed with waste liquor in a manner analogous to first chamber 13a, and a second oxygenated liquid-solid is formed which mixes with the waste liquor. It should be noted that in FIG. 1, free mixing occurs between the waste liquor and the oxygenated liquid-solid from each oxygenated stage. Stated otherwise, there is no predetermined liquor flow pattern between the stages. However, the oxygen-containing gas flows in a series manner consecutively from the first to the second to the third oxygenation chamber 13c with progressively decreasing oxygen purity. That is, the unconsumed oxygen-containing gas disengaged from the second oxygenated liquor-solid in chamber 13b flows through restricted passage means 23 to third chamber 13c for mixing therein with the waste liquor. The still unconsumed oxygen-containing gas comprising more than 21% oxygen is discharged from the third chamber gas space through conduit 24 having control valve 25 therein. This gas may be released to the atmosphere or further processed as desired. Purified liquid is discharged from lagoon 10 by overflow weir 26 communicating with passageway 27 which may for example join a flowing body of water.

At least 60% (by volume) of the oxygen in the feed gas entering first chamber 13a is consumed in the liquid-solid of all stages, so that the gas discharged through conduit 24 contains no more than 40% of the entering oxygen. Moreover, the feed gas comprises at least 50% by volume) oxygen. The selection of a particular feed gas oxygen purity and percent oxygen consumption for a plant depends on a variety of factors, e.g., the nature of the waste, the number of stages to be employed, the geographic location, and the value of the aeration gas. The cost of the contained oxygen in the feed gas varies substantially with purity. However, any savings in contained oxygen cost realized at reduced purity tend to be offset in the waste treatment system where lower oxygen partial pressure requires more power and/or larger oxygenation chambers.

In the FIG. 2 embodiment four separate chambers 13a, 13b, 13c, and 13d are provided for staged gaseous oxygenation of waste liquor in enclosure 10, illustrated as a tank. The gas spaces within first and second chambers 13a and 13b are separated by common partition 28a–b extending downwardly from cover 17 to a position below the waste liquor level. Similarly, common partition 28b–c separates the second and third chamber gas spaces and common partition 28c–d separates the third and fourth chamber gas spaces. Each chamber is provided with a mechanically driven surface-type impeller 18 for oxygenating the waste liquor near the surface and thus providing intimate mixing. Since the common partitions extend only a short distance into the liquor, considerable mixing occurs among the liquors from the four oxygenation stages.

Restricted flow means are provided in the common partitions 28a–b, b–c and c–d and may comprise small perforations 29. Accordingly, back-mixing of oxygen gas from a succeeding oxygenation chamber to a preceding chamber is avoided as long as a slight pressure differential is maintained.

In the FIG. 3 embodiment the mixer 31 comprises a brush-type construction with horizontal shaft 30 extending the length of the adjoining oxygenation chambers and through the walls of waste liquor storage tank 10. Multiple radial spines in circumferential arrays 31 are axially spaced along the shaft and positioned to partially dip within the liquor. On rotation of shaft 30 they project liquor into the gas space of each chamber and cause liquor to circulate within tank 10. In this manner effective contact surfaces are created and the fluids are intimately mixed. As in the FIG. 2 embodiment, the liquor freely circulates from stage-to-stage. The unconsumed oxygen-containing gas flows from first chamber 13a to second chamber 13b through restricted conduit 22, and from the latter to third chamber 13c through restricted conduit 23. These conduits may be sized to provide only sufficient cross-sectional area for the desired flow, or alternatively may be provided with restricted flow means as for example, an orifice in the cross-section.

In the aforedescribed embodiments, each of the gas chambers collects and retains the aeration gas in the gas stage and one of the fluids is circulated against the other. The retention period of a quantity of gas in each stage is long compared to the time the gas is in transit from one stage to another, i.e., a time ratio of at least 30.

In the FIG. 4 embodiment, the mixing means for each stage includes a sparger 32 submerged in the liquor and blades 33 preferably positioned immediately above the sparger. Blades 33 are joined by a rotatable shaft to suitable dirving means, as for example a turbine. The small oxygen gas bubbles discharged from the sparger 32 are distributed through the chamber in intimate contact with the liquor by the turbine pressure and rise through the liquor to the surface where the unconsumed portion disengages into the gas space along with reaction product gases.

To provide the necessary pressure driving force for continuous circulation of oxygen gas through the chamber, the inlet of compressor or blower 34 is positioned in gas flow communication with the chamber gas space and the discharge thereof is directed through conduit 35 to sparger 32.

The FIG. 4 system differs from FIGS. 1–3 by providing means for flow of oxygenated liquid-solid from stage-to-stage in the same direction, i.e., cocurrent, as the flow of unconsumed oxygen gas. Common partitions 28a–b, 28b–c, and 28c–d extend substantially to the base of tank 10 and are joined thereto in fluid-tight relation. Oxygenated liquid-solid flow is provided by restricted flow opening 36 in the first-second chamber common partition 28a–b preferably near or beneath the bottom thereof, restricted opening 37 preferably in the upper portion of second-third chamber common partition 28b–c and restricted opening 38 preferably in the bottom portion of third-fourth chamber common partition 28c–d. This liquid-solid flow and oxygen gas flow relation affords the highest possible oxidation rate per unit volume of waste liquor, and the highest treatment efficiency for a given total oxygenation time.

Figure 6:
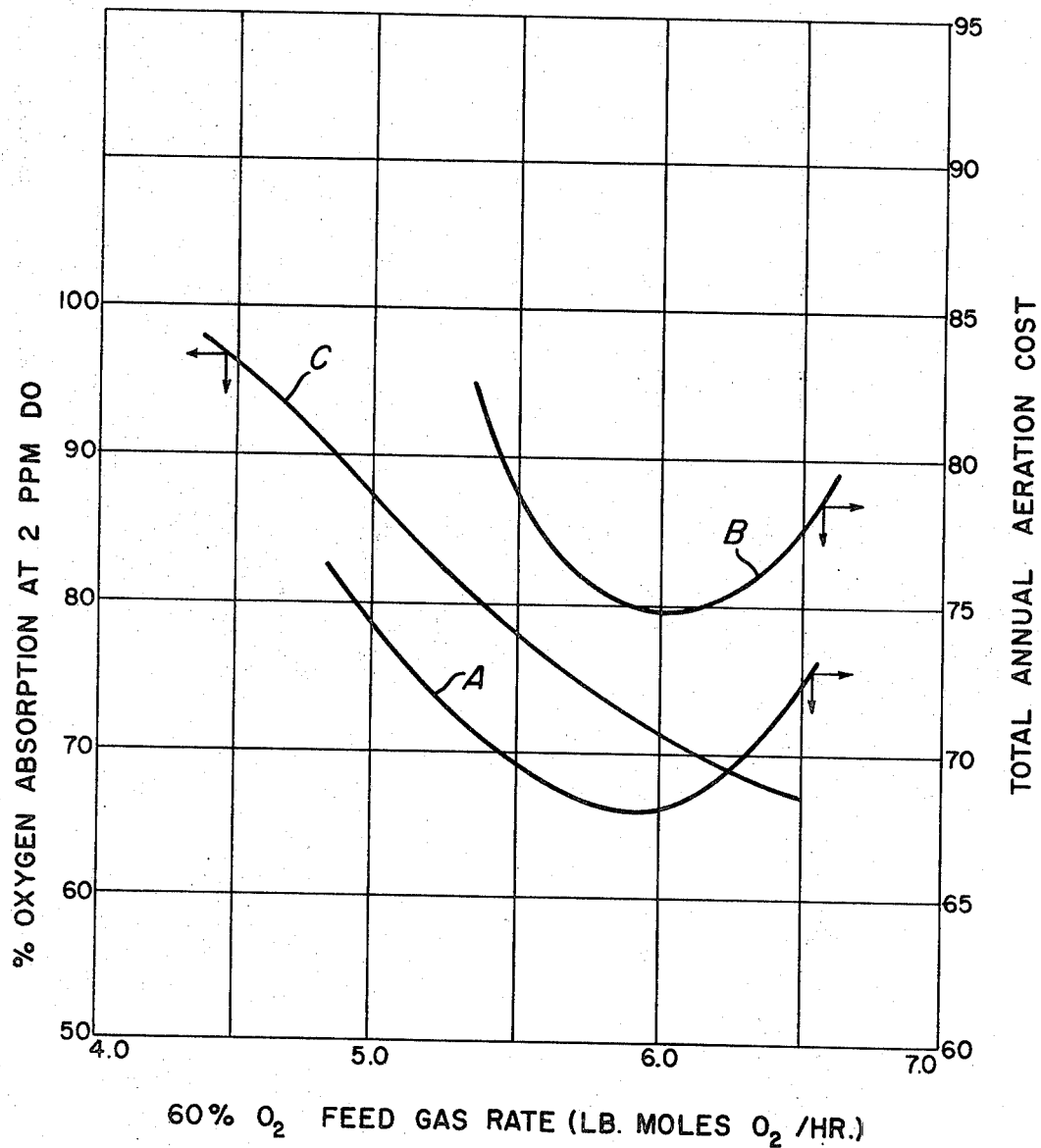
FIG. 6 is a performance comparison graph similar to FIG. 5 but for a system employing 60% oxygen feed gas.
Figure 7:
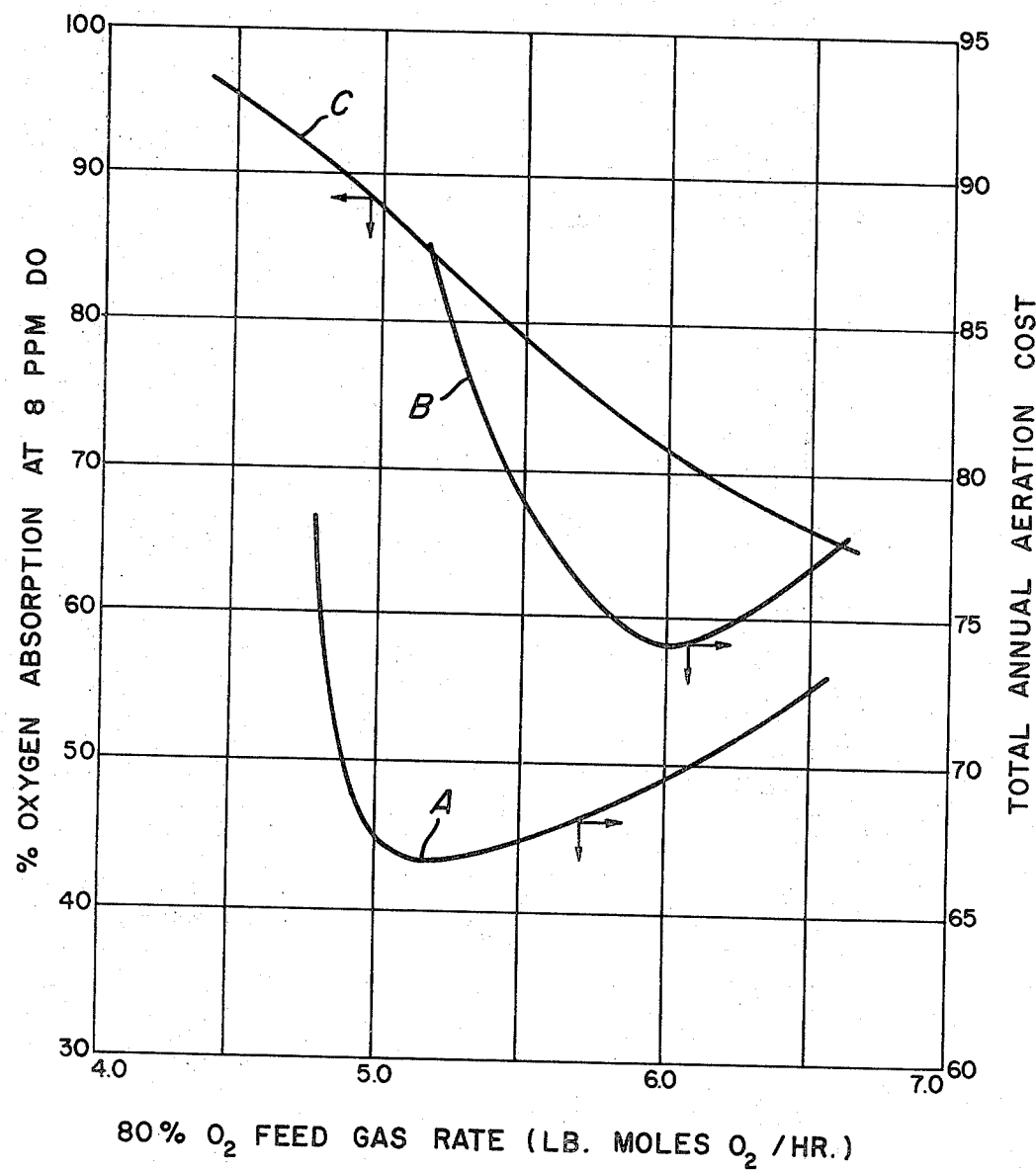
FIG. 7 is a performance comparison graph similar to FIGS. 5 and 6 but for a system employing 80% oxygen feed gas and wherein an 8 p.p.m. DO level is maintained.

As illustrated in FIGS. 5–7 (discussed hereinafter in detail) at least 90% oxygen utilization is attainable with 60% and higher oxygen feed gas using six or more stages and cocurrent gas-liquid-solid flow. Oxygen utilization above 90% can also be obtained with 50% to 60% oxygen feed gas, but the corresponding feed gas rates are progressively further displaced from optimum values. With a fewer number of stages the oxygen utilization tends to diminish but 85% oxygen utilization should be attainable in four stages using cocurrent flow and 99.5% oxygen feed gas.

The cocurrent flow embodiment of this invention is uniquely suited to satisfy the inherent variation in BOD and oxygen demand of staged liquid-solid flow. That is, the BOD is highest in the first stage and progressively decreases through succeeding gaseous oxygenation stages. The feed gas representing the highest purity oxygen is contacted with the waste liquor in this first stage. Accordingly, the first or feed gas stage has the highest oxygen partial pressure and thus the highest oxygen transfer rate, so is able to supply the high oxygen demand in this stage.

In the FIGS. 1–3 embodiments the activated sludge is substantially uniformly distributed in the liquid-solid contacted with oxygen-containing gas in each gaseous oxygenation stage. This distribution is afforded by natural circulation and the mixing means of each stage. In the FIG. 4 embodiment the fourth oxygenated liquid-solid is transferred through flow restricted conduit 39 to clarifier 40 for separation into purified liquid and actviated sludge. Clarifier constructions are well-known to those skilled in the waste treatment art and may for example include rotatable scraper 41 at the lower end to prevent coning. The activated sludge is withdrawn through bottom conduit 42 and at least a portion thereof is recycled through pump 43 to first oxygenation chamber 13a for mixing with the waste liquor and oxygen-containing feed gas. The purified liquid is discharged from clarifier 40 through conduit 44.

It should be understood that clarifier 40 may alternatively be positioned between two gaseous oxygenation stages rather than following the last oxygenation stage. For example, a portion or all of the third oxygenated liquid-solid may be discharged from third chamber 13c to clairifier 40. Under these circumstances a portion of the activated sludge from the clarifier may be directed to fourth chamber 13d for further oxygenation, and another portion of activated sludge recycled to the first chamber 13a. As a further variation it may be desirable to pass the first oxygenated liquid-solid to a clarifier to remove supernatent liquid and thereby reduce the quantity of material handled in the succeeding oxygenation stage or stages. Under these circumstances the food is primarily absorbed on the sludge in the first stage and thereafter assimilated and oxidized.

To achieve the advantages of this invention, at least two gaseous oxygenation stages are required wherein feed gas containing at least 50% oxygen is mixed with BOD-containing water such as waste liquor and active biomass, e.g., sludge, in a first stage and the unconsumed oxygen-containing gas from this stage is contacted with liquid-solid in a second oxygenation stage. Although the FIGS. 1–4 embodiments relate to systems in which the oxygen-containing feed gas is contacted with waste liquor which has not been previously mixed with oxygen-containing gas, this characteristic is not essential as long as the first stage waste liquor has a substantial food content (BOD). Under some circumstances it may be advantageous to mix the incoming waste liquor with oxygen-containing gas in a preliminary treatment and discharge the unconsumed oxygen-containing gas from this preliminary oxygenation treatment for another use. For example, if the oxygen concentration of this gas is appreciably higher than in air, it may be used in a combustion process. The liquid-solid from such a preliminary oxygenation treatment is thereafter flowed to the first oxygenation stage of this invention.

As previously indicated, the fluid streams and the mixing energy input to the oxygenation stages are regulated. With respect to the fluid streams, the practice of this invention does not require adjustment of all fluid flows but instead only selected flows which are readily controlled to maintain the desired relationships. For example, in a waste treatment system the waste liquor and cleaned effluent liquid flows are not normally regulated but instead normally fluctuate widely between the high put day period and the low throughput night period. The oxygen feed gas rate may be readily adjusted by control valve 21. In the embodiments wherein activated sludge is recycled to the first gaseous oxygenation stage, the recycle rate may be adjusted to reflect variation in waste liquor flow. This adjustment may be accomplished by varying the speed of the activated sludge recycle pump, e.g., pump 43 in FIG. 4. The aeration gas mixing rate may be controlled by the power input to the mixing means, e.g., impeller 18 of FIG. 1, radial spines 31 of FIG. 3, and recirculation pumps 34 of FIG. 4.

If further control of fluid flows is necessary, adjustable valves may be provided in the unconsumed oxygen-containing gas restricted passageway means between stages, as for example condits 22 and 23 of FIG. 1. Similarly, adjustable valves may be provided in the oxygenated liquid-solid restricted flow means between stages. However, it is anticipated that in most embodiments of the invention, sufficient flow adjustment will be afforded by fixed size openings so that the flows will be a function of the fluid pressures. In the FIG. 4 embodiment, both the gas and the liquid-solid are retained in each stage and both fluids are circulated one against the other. Again the retention time of the fluids in each stage is long compared with the transfer time between stages.

In the stage liquid-solid flow embodiments of this invention wherein the oxygen preferably flows cocurrently as in FIG. 4, or countercurently, the total contact or retention time for the liquid-solid is preferably between 20 and 180 minutes. This contact time is most instances refers to the biomass solids (the total bacteria present), since this is the material which traverses the complete staged oxygenation system regardless of where the effluent may be withdrawn. In the arrangement wherein all oxygenation occurs upstream of the clarifier, the contact time is calculated as the total liquid volume of the oxygenation chambers divided by the volumetric flow rate of combined BOD-containing water influent and activated sludge recycle. If BOD-depleted supernatant liquid is separated from oxygenated liquid-solid discharged from an intermediate stage, i.e. contact stabilization, the total contact time for a given quantity of BOD plus biomass is the sum of the contact time upstream and downstream of the intermediate clarifier. The upstream contact time is calculated by dividing the upstream liquid volume of oxygenation chambers by the volumetric flow rate of combined BOD-containing water influent and activated sludge recycle. The downstream contact time is calculated by dividing the downstream liquid volume of oxygenation chambers by the slude discharge rate from the clarifier flowing to the next higher stage oxygenation chamber.

The total contact time desired in a particular staged liquid-solid embodiment of the invention depends on whether auto-oxidation (endogenous respiration) is to be enhanced. The latter is described more completely in the application Ser. No. 838,499 "Bio-Oxidation With Low Sludge Yield," filed simultaneously in the name of John R. McWhirter. If the sole objective is to assimilate and oxidize the BOD of the influent BOD-containing water, then a relatively short contact time will suffice. Fairly complete assimilation of BOD has been experimentally achieved after two stages of oxygenation with 99.5% oxygen feed gas and cocurrent liquid-solid flow after a contact time of 37½ minutes in each stage or 75 minutes total. The effluent from the second stage was low in BOD (e.g., 20–35 p.p.m.) and the sludge stabilized and well settled. In other tests wherein some auto-oxidation occurred, the total contact time was about 2.5 hours for three stages (50 minutes/stage) of cocurrent flow and clarification after the third stage (see FIG. 4 and Table A). In another test series with auto-oxidation and four stages of cocurrent flow and clarification after the fourth stage, the total contact time was 2.7 hours or 40.5 minutes per stage. It also appears that a total contact time for a six stage system having these same characteristics may be 1.5 hours (15 minutes per stage). A total contact time of at least 20 minutes is necessary for oxygen absorption and BOD assimilation. A total contact time of less than 180 minutes provides substantial reduction of sludge production if auto-oxidation is to be practiced, permits avoidance of settling problems, and still permits a substantial reduction in aeration chamber capacity as compared with conventional practice. Present activated sludge plants employing air aeration are believed to operate with total contact time of 180–360 minutes.

The aforementioned contact times are satisfactory for relatively low strength municipal waste liquids having up to about 300 p.p.m. BOD. For higher strength wastes from chemical plants, longer contact times are necessary to yield an effluent of comparable purity.

It is also preferred to maintain the dissolved oxygen content (DO) of the liquid-solid mixture at least at 0.5 p.p.m. in the first gaseous oxygenation stage of the staged liquid-solid embodiment. The DO is rapidly consumed by the biomass in the first stage so that the DO level may be suppressed even though oxygen is being dissolved at high rate. It has been observed in the aforementioned three-stage tests that the first stage DO level on occasions was between 0.5 and 1.0 p.p.m. However, with all oxygenation stages operating the DO level rose quickly through subsequent stages and the treatment quality was higher. Under the preferred conditions of the staged liquid-solid embodiment including a volatile suspended solids content of at least 3000 p.p.m. in the first gaseous oxygenation stage, a low DO of 0.5 p.p.m. does not necessarily mean that an oxygen-starved (near anerobic) condition exists. It merely indicates that the oxygen treatment rate is mass transfer limited and that still higher oxygenation rates might be achievable if a more efficient aerator were available. In order to avoid a mass transfer limited condition, it is preferred to maintain the dissolved oxygen level of the first gaseous oxygenation stage at 2 p.p.m. or higher. The DO level of this stage is also preferably maintained below about 5 p.p.m. so as to avoid excessive energy input to the interests of economy and settleability. Too much attrition on the floc by virtue of excessive mixing will impair settleability, although reagglomeration of the bacteria may occur to some extent in subsequent gaseous oxygenation stages before the clarification step.

The advantages of this invention were demonstrated in a series of tests using a system similar to FIG. 4 and municipal sewage as waste liquor. In these particular tests three oxygenation stages were employed and the third oxygenated liquid-solid was transferred to a gravity-type clarifier for separation of activated sludge. The latter was recycled to the first stage.

The entire assembly was positioned within a rectangular tank 14 feet long x 5 feet wide x 4 feet deep. Each oxygenation stage and the clarifier had a rectangular horizontal cross-section of 5 feet x 3.5 feet and an operating volume of about 457 gallons. The mixing system for each stage consisted of a ½-HP motor-driven submerged variable speed axial flow 6-inch diameter impeller which dispersed gas from a stationary sparger located directly beneath the agitation impeller. The spargers were constructed of ½-inch diameter pipe with sixteen spaced ¹⁄₁₆-inch diameter orifices. Each mixing stage employed a variable speed sliding vane rotary compressor to recirculate the oxygenating gas from the overhead gas space back to the submerged sparger. The gas recirculation rate within each stage and the mechanical mixing rate were separately and independently controlled; the gas recirculation rates were measured by rotameters and the mixer power measured by watt meters.

Oxygen gas at 99.5% purity was supplied from pressure-regulated liquid storage cylinders. The feed oxygen was saturated with water and then passed through a wet drum meter to enable manual measurement of its instantaneous flow rate and cumulative volumetric flow. The oxygen was introduced into the gas space above the waste liquor and activated sludge mixture in the first stage, and the unconsumed oxygen gas (plus disengaged reaction product gas) conducted to each succeeding stage by a 24–30 inch length of 1.85-inch diameter (ID) tubing extending through the first-second stage vertical partition and the second-third stage partition. These openings were sufficiently large to permit restricted gas flow from first stage to second stage to third stage under small pressure differential, and to substantially avoid back-mixing of the oxygenating gas from a higher to a lower stage. This pressure differential was on the order of 0.125 inch water. The unconsumed oxygen-containing gas from the third stage was exhausted through a second wet drum meter and measuring device. The oxygenated liquid-solid flowed cocurrently with the gas from each stage to the next higher oxygenation stage through eight 2-inch diameter holes providing a total flow area of 25 sq. inches for each of openings 36, 37 and 38.

The clarifier contained a single V-notch overflow weir, and was equipped with a 34-inch diameter bottom scraper motor-rotated at about 6 revolutions per hour. The recycle activated sludge was returned to the first oxygenation stage by a variable speed pump.

Composite samples of the raw sewage and purified effluent were collected over 12 or 24-hour periods. The composite samples were stored in a refrigerated container maintained at about 0° C. prior to analysis. On some days, two sets of samples were composited from 9 a.m. to 9 p.m. and from 9 p.m. to 9 a.m. respectively. These time spans were chosen to encompass the anticipated high strength sewage conditions experienced during the daylight hours, and the relatively low strength conditions prevalent at night. However, most of the data was based on 24-hour composite analyses. The dissolved oxygen (DO) concentration of the liquid-solid in the first oxygenation stage was continuously monitored and recorded. Accordingly, it provided data on the daily time variations in DO level at the essentially constant flow rate and oxygenation conditions. As such it was indicative of the daily variations in BOD strength of the raw sewage and consequently the system's oxygen demand.

The test system was operated at average raw sewage feed and recycle sludge rates of about 6.8 and 2.0 g.p.m. respectively. This corresponds to a 150-minute total contact time (including the recycle sludge flow) in the three stages of oxygenation, and about a 29% return sludge (by volume) flow rate. The volatile suspended solids level of the liquid-solid in each stage (MLVSS) was maintained at between 3200 and 3600 p.p.m., with an average of about 3400 p.p.m. Sludge was wasted from the clarifier on an intermittent and irregular basis. The oxygen absorption data together with the biological process performance and operating data during selected periods of operation are summarized in Table A.

All measurements during these tests were conducted in accordance with the standard practices of the waste treatment industry as for example outlined in "Standard Methods for the Examination of Water and Wastewater," published by the American Public Health Association, Inc., 11th ed. (1962).

Inspection of Table A and in particular the thirteen days average data reveals that 91% of the BOD in the raw sewage was removed in a system characterized by remarkably efficient oxygen utilization (85% absorption) and low energy consumption per unit of oxygen input (0.26 lb.-moles $O_2$ introduced to the first stage per HP).

As previously indicated, it is preferred to flow the oxygenated liquid-solid cocurrently with the unconsumed oxygen gas from stage-to-stage. This is surprising because most mass transfer systems are usually operated with the transferring fluids flowing countercurrent to each other. The advantages of cocurrent flow are illustrated in the FIGS. 5–7 performance comparison graphs and the FIG. 8 cost comparison graph. The data is computed, but based on extrapolations from actual experiments. The system comprises six stages of gaseous oxygen aeration with various selected first stage feed gas purities and DO levels. The oxygenated liquid-solid is staged in a manner analogous to FIG. 4, either cocurrent or countercurrent to the oxygen-containing gas. The system is assumed to treat municipal waste feed at a rate of 3.6 million gallons per day containing 250 p.p.m. BOD, with 4000 p.p.m.

TABLE A

|  | Day A | Day B | Day C | Thirteen days average |
|---|---|---|---|---|
| Raw sewage BOD (p.p.m.) | [1] 332 | [1] 208 | [1] 227 | 210 |
| Purified liquid BOD (p.p.m.) | [1] 33.0 | [1] 28.0 | [1] 18.1 | 19 |
| BOD removal (percent) | [1] 90.2 | [1] 86.5 | [1] 92.0 | 91 |
| Liquid-solid: | | | | |
| MLSS (p.p.m.): | | | | |
| Stage I | 4,453 | 4,265 | 4,051 | 4,100 |
| Stage II | 4,645 | 4,594 | 4,055 | |
| Stage III | 4,567 | 4,551 | 3,785 | |
| Recycle sludge | 18,622 | 16,673 | 13,202 | 14,000 |
| MLVSS (p.p.m.): | | | | |
| Stage I | 3,527 | 3,291 | | 3,400 |
| Stage II | 3,712 | 3,451 | | |
| Stage III | 3,533 | 3,305 | | |
| Recycle sludge | 14,988 | 12,363 | | 11,000 |
| DO level (p.p.m.) [2]: | | | | |
| Stage I | 1.3 | 0.6 | 0.7 | 0.6 |
| Stage II | 2.2 | 1.0 | 1.0 | 1.2 |
| Stage III | 8.1 | 1.6 | 4.2 | 4.0 |
| Oxygen feed rate to stage I: | | | | |
| C.F.H | 15.2 | 15.7 | 18.1 | 16.0 |
| Lbs. $O_2$/hr | 1.17 | 1.22 | 1.41 | 1.24 |
| Exhaust oxygen rate from stage IV (lbs./hr.) | | 0.208 | 0.145 | |
| Overall oxygen absorption (percent) [1] | | 83.1 | 89.7 | 85 |
| Oxygenation gas analysis (percent): | | | | |
| Stage I $O_2$ | | 90.4 | 90.3 | 90.0 |
| Stage II $O_2$ | | 83.4 | 83.5 | 83.5 |
| Stage III $O_2$ | | 75.3 | 74.3 | 74.2 |
| Volumetric flow ratio to stage I ($O_2$/raw sewage+recycle) | 0.20 | 0.21 | 0.26 | 0.22 |
| Total energy consumption (hp.) | 0.26 | 0.26 | 0.27 | 0.26 |
| Lbs.-moles $O_2$ to stage I/hp.×hr | 0.14 | 0.15 | 0.16 | 0.15 |

[1] These figures represent daytime (9 a.m.–9 p.m.) composite sample values. All other BOD values are 24 hours composite values.
[2] Measured during steady state low DO period of 11 A.M. to 4 P.M.

volatile suspended solids content (MLVSS) in the first stage mixed liquor (feed plus sludge recycle) and 120 minutes total contact time for the liquid-solid in the six stages.

In each of FIGS. 5, 6 and 7, curve A represents the preferred cocurrent flow and curve B represents the optional countercurrent flow of gas and liquid-solid. This performance is presented as total annular aeration costs (operating and investment) corresponding to a range of oxygen feed rates to the system (lb.-moles $O_2$ per hour). The cost ordinate (right side) has been normalized using a scale wherein 100 cost units corresponds to an appropriately large sum.

Curve C on each of FIGS. 5, 6 and 7 shows oxygen utilization as the left side ordinate, through the range of oxygen feed rates. For these comparisons, the oxygen utilization was considered to be the same for both cocurrent and countercurrent operation, and the power needed to achieve this utilization was calculated.

FIGS. 5, 6 and 7 show a very substantial advantage for cocurrent flow as compared to countercurrent flow over a broad range of oxygen feed rates, and for the entire range of oxygen feed gas purities contemplated by this invention. Table B qualitatively illustrates this advantage at a representative feed rate of 5.5 lb. moles $O_2$ per hour.

TABLE B

| | Normalized total annual aeration cost | |
|---|---|---|
| Feed gas and DO | Cocurrent flow | Countercurrent flow |
| 99.5% $O_2$, 2 p.p.m. (FIG. 5) | 64 | 66 |
| 60% $O_2$, 2 p.p.m. (FIG. 6) | 69.5 | 78 |
| 80% $O_2$, 8 p.p.m. (FIG. 7) | 67.5 | 77.5 |

Figure 8:
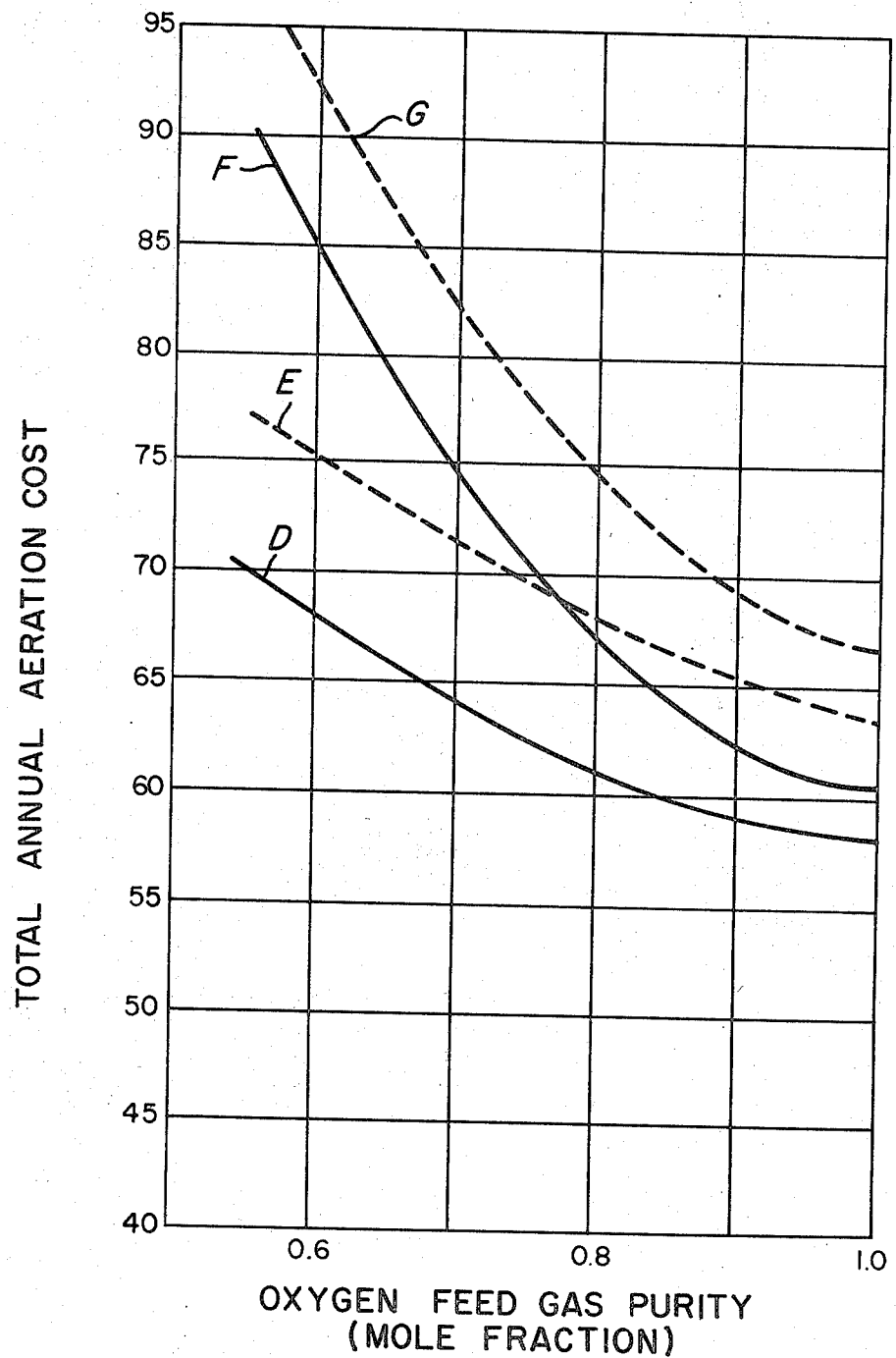
FIG. 8 is a cost comparison graph for optimum operation of cocurrent and countercurrent flow systems as a function of feed gas oxygen purity.

FIG. 8 compares the total annual aeration costs for the illustrative plant under optimum conditions for each mode of operation. By way of illustration, curve D represents the minimums from the cocurrent flow and 2 p.p.m. DO curves A over the contemplated range of oxygen feed gas purities, i.e., 50% to 100% $O_2$. The remaining curves represent the minimums from other cost curves for the gas and liquid-solid flow relationships and DO levels indicated in Table C.

TABLE C

Curve D—Cocurrent and 2 p.p.m. DO
Curve E—Countercurrent and 2 p.p.m. DO
Curve F—Cocurrent and 8 p.p.m. DO
Curve G—Countercurrent and 8 p.p.m. DO To exemplify the use of these curves, FIG. 8 shows that the optimum performance of the 99.5% $O_2$ feed gas-2 p.p.m. DO-cocurrent flow system occurs with an oxygen feed gas rate of 4.8 lb. moles per hour and an oxygen utilization of 95%, the corresponding normalized total aeration cost being about 58. This performance is represented by the right end of curve D in FIG. 8.

Table D is a qualitative illustration of the optimums for cocurrent and countercurrent flow as summarized in FIG. 8.

TABLE D

| Feed gas and DO | Normalized total annual aeration cost | |
|---|---|---|
| | Cocurrent flow | Countercurrent flow |
| 99.5% $O_2$, 2 p.p.m. (curves D and E) | 58 | 63 |
| 60% $O_2$, 8 p.p.m. (curves F and G) | 85 | 92 |

Table E illustrates conditions in a 6-stage, cocurrent oxygen aeration system similar to FIG. 4, outfitted with aerators having an air standard transfer efficiency of about 3 lb. moles $O_2$/HP-hr. Conditions typify the treatment of 250 p.p.m. BOD municipal waste with 99.5% $O_2$ in mixed-liquor containing 4000 p.p.m. MLVSS for 2-hours total residence time. For comparison, the data is shown for both 2 p.p.m. and 8 p.p.m. DO in the mixed liquor. Whereas adequate, high-rate BOD removal can be obtained with a DO level of 2 p.p.m., it is usually beneficial to obtain substantially higher levels. Higher DO levels in the mixed-liquor, hence in the purified effluent, help to alleviate any oxygen-depleted condition pre-existing in the receiving waters. Conditions in the clarifier are also improved.

It is seen in the data of Table E that the oxygen content of the aeration gas decreases progressively from stage-to-stage and that this profile is matched with a similarly decreasing biochemical oxygen demand (BOD) through the system. The highest oxygen partial pressure is employed in the aeration of highest strength mixed-liquor, and vice versa.

It is also apparent that the volume of aeration gas diminishes greatly in transit through the stages, demonstrating that a large fraction of the feed oxygen is dissolved and that the impurities are vented with only a small fraction of residual, unconsumed oxygen.

Finally, it is evident that the performance of the process with 99.5% oxygen feed is quite insensitive to DO level maintained in the mixed liquor. With DO-levels of either 2 p.p.m. or 8 p.p.m., the soluble BOD removal is virtually complete and the utilization of oxygen is above 90%.

TABLE E

| | Stage | | | | | |
|---|---|---|---|---|---|---|
| | 1 | 2 | 3 | 4 | 5 | 6 |
| DO=2 p.p.m. | | | | | | |
| Aeration gas composition: | | | | | | |
| $O_2$, vol. percent | 86.8 | 78.9 | 72.3 | 65.2 | 55.8 | 40.0 |
| $N_2$, vol. percent | 8.5 | 14.5 | 20.1 | 26.4 | 35.1 | 50.3 |
| $CO_2$, vol. percent | 2.9 | 4.4 | 5.4 | 6.1 | 6.8 | 7.4 |
| Feed gas volume, lb. moles/hr | 4.6 | 3.5 | 2.6 | 2.0 | 1.6 | 1.1 |
| Exit gas volume, lb. moles/hr | 3.5 | 2.6 | 2.0 | 1.6 | 1.1 | 0.6 |
| Percent of feed $O_2$ absorbed/stage | 35 | 20 | 13 | 10 | 9 | 8 |
| Accumulative percent of feed $O_2$ ads. | 35 | 55 | 68 | 78 | 87 | 95 |
| BOD, p.p.m. | 115 | 53 | 24 | 11 | 5 | 2 |
| DO=8 p.p.m. | | | | | | |
| Aeration gas composition: | | | | | | |
| $O_2$, vol. percent | 84.2 | 75.2 | 67.9 | 60.6 | 52.1 | 40.1 |
| $N_2$, vol. percent | 12.2 | 19.3 | 25.5 | 31.9 | 39.8 | 51.2 |
| $CO_2$, vol. percent | 2.0 | 3.3 | 4.2 | 4.9 | 5.5 | 6.1 |
| Feed gas volume, lb. moles/hr | 5.4 | 4.0 | 3.1 | 2.5 | 2.0 | 1.5 |
| Exit gas volume, lb. moles/hr | 4.0 | 3.1 | 2.5 | 2.0 | 1.5 | 1.1 |
| Percent of feed $O_2$ absorbed/stage | 38 | 18 | 12 | 9 | 8 | 7 |
| Accumulative percent of feed $O_2$ ads. | 38 | 56 | 68 | 77 | 85 | 92 |
| BOD, p.p.m. | 120 | 57 | 27 | 13 | 6 | 3 |

As previously indicated, the broadest method aspect of this invention does not require any particular flow sequence for the BOD-containing water and active biomass relative to the oxygen-containing gas. The liquid-solid (liquor) may be freely mixed among the gaseous oxygenation stages as for example illustrated in FIGS. 1–3, or may be sequentially flowed from stage-to-stage and preferably cocurrent to the oxygen-containing gas flow as illustrated in FIG. 4. Alternatively the liquor may flow countercurrent to the oxygen-containing gas. For example, in a staged liquor flow system the first unconsumed oxygen-containing gas from the first gaseous oxygenation stage may be flowed to a second gaseous oxygenation stage receiving liquor from a second liquor-solid oxygenation stage. The second unconsumed oxygen-containing gas from this second gaseous oxygenation stage may then be flowed to a third gaseous oxygenation stage for mixing with liquor-solid from the first gaseous oxygenation stage. In this instance the third gaseous oxygenation stage is also the second liquor oxygenation stage. The gas discharged from this stage contains more than 21% oxygen according to this invention, and third oxygenated liquid-solid discharged from the second gaseous oxygenation stage would have the lowest food content and highest dissolved oxygen content of the system.

FIGS. 9 and 10 are schematic flow diagrams of other gas-liquid-solid flow relationships contemplated by the invention, having the common characteristic of at least two series-connected gas stages through which the gas flows in the direction of reducing BOD content. The stages have been numbered in gas flow sequence and the gas flow is identified by dotted lines with the liquor flow shown as solid lines. The interstage flows may for example be through the means illustrated in any of FIGS. 1 and 4, and are identified by arrows. Mixing means and valving are not shown for simplicity.

In FIG. 9, the gas and liquor flow cocurrently in gas stage 1 but countercurrently in gas stages 2, 3 and 4 and gaseous oxygen concentration progressively diminishes therethrough. The liquor flows consecutively in staged manner through gas stages 1, 4, 3 and 2, and the BOD is progressively reduced. The unconsumed oxygen-containing gas of lowest oxygen purity is discharged from stage 4 and the oxygenated liquid-solid of lowest BOD is discharged from stage 2. Accordingly, the gas and liquor flows are countercurrent in stages 2, 3 and 4.

In FIG. 10, the liquor is introduced to stage 2 and flows consecutively in staged manner through gas stages 3, 4 and 1 for discharge from the latter. The BOD is progressively reduced in the same sequence. The gas-liquor flow relationship is countercurrent in gas stage 1 but cocurrent in gas stages 2, 3 and 4.

Although not illustrated, a clarifier may be joined to the final liquid oxygenation stage, i.e., gas stage 2 of FIG. 9 or gas stage 1 of FIG. 10, in the manner of FIG. 4. Alternatively a clarifier could be positioned between two liquor stages in the previously described manner.

Although certain embodiments have been described in detail, it will be appreciated that other embodiments are contemplated along with modifications of the disclosed features, as being within the scope of the invention.

I claim:

1. In a method for treating BOD-containing water by oxygenation in contact with active biomass, the improvement comprising: mixing BOD-containing water, biomass and feed gas comprising at least 50% oxygen (by volume) and simultaneously continuously recirculating one of such fluids against the other fluids in a first gaseous oxygenation stage to form first oxygenated liquid-solid and first unconsumed oxygen-containing gas comprising at least 35% oxygen; discharging said first unconsumed oxygen-containing gas from the first stage and mixing the discharged gas with aqueous liquid-solid and simultaneously continuously recirculating one of such fluids against the other fluids in at least a second gaseous oxygenation stage to form at least a second oxygenated liquid-solid and second unconsumed oxygen-containing gas of lower oxygen purity that the first gas, and discharging the second gas from the second stage; flow-regulating the fluid streams and regulating the mixing and gas-liquid contact energy input to the first and succeeding stages such that:

(a) at least 60% (by volume) of the oxygen in said feed gas is consumed in the liquid-solid of all stages.

(b) between 0.06 and 0.40 lb.-moles per hour of oxygen are introduced to the first stage per one horsepower of mixing and gas-liquid contact energy used in all stages, and (c) the gas discharged from the final gaseous oxygenation stage wherein unconsumed oxygen gas from the preceding stage has been contacted with aqueous liquid-solid, comprises more than 21% and less than 80% oxygen.

2. In a method for treating aqueous waste liquor for disposal by oxygenation in contact with activated sludge, the improvement comprising: mixing liquor, activated sludge and feed gas comprising at least 50% oxygen (by volume) and simultaneously continuously recirculating one of such fluids against the other fluids in a first gaseous oxygenation statge to form first oxygenated liquid-solid and first unconsumed oxygen-containing gas comprising at least 35% oxygen; discharging said first unconsumed oxygen-containing gas from the first stage and mixing the discharged gas with waste liquid-solid and simultaneously continuously recirculating one of such fluids against the other fluids in at least a second gaseous oxygenation stage to form at least a second oxygenated waste liquid-solid and second unconsumed oxygen-containing gas of lower oxygen purity that the first gas, and discharging the second gas from the second stage; flow-regulating the fluid streams and regulating the mixing and gas-liquid contact energy input to the first and succeeding stages such that:

(a) at least 60% (by volume) of the oxygen in said feed gas is consumed in the waste liquid solid of all stages.

(b) between 0.06 and 0.40 lb.-moles per hour of oxygen are introduced to the first statge per one horsepower of mixing and gas-liquid contact energy used in all stages, and (c) the gas discharged from the final gaseous oxygenation stage wherein unconsumed oxygen gas from the preceding stage has been contacted with waste liquid-solid, comprises more than 21% and less than 80% oxygen.

3. A method according to claim 2 wherein oxygenated waste liquid-solid from a higher than first stage is separated into purified liquid and activated sludge, and at least part of the activated sludge is recycled to the first gaseous oxygenation stage.

4. A method according to claim 2 wherein the oxygenated waste liquid-solid from each stage is transferred to the next succeeding gaseous oxygenation mixing stage as the waste liquid-solid to be mixed with unconsumed oxygen gas from said each stage, and wherein oxygenated waste liquid-solid from a last gaseous oxygenation mixing stage is separated into purified liquid and activated sludge, and at least part of the activated sludge is recycled to the first gaseous oxygenation stage.

5. A method according to claim 4 wherein the volatile suspended solids content (MLVSS) of the waste liquid-solid mixture in the first gaseous oxygenation stage is at least 3000 p.p.m.

6. The method according to claim 2 wherein the feed gas comprises at least 90% oxygen and the first unconsumed oxygen-containing gas comprises at least 55% oxygen.

7. A method according to claim 4 wherein the dissolved oxygen content (DO) of the liquid-solid mixture in the first gaseous oxygenation stage is at least 0.5 p.p.m.

8. A method according to claim 3 in which the food content (BOD) of the oxygenated liquid-solid in each stage is higher than the next succeeding gaseous oxygenation stage.

9. A method according to claim 2 wherein at least three mixing stages are provided, the oxygenated waste liquid-solid from each stage is transferred to the next succeeding gaseous oxygenation stage as the waste liquid-solid to be mixed with unconsumed oxygen gas from said each stage, the volatile suspended solids content (MLVSS) of the waste liquid-solid mixture in the first oxygenation stage is at least 3000 p.p.m., oxygenated liquid-solid from the last mixing stage is separated into purified liquid and activated sludge, and at least part of the activated sludge is recycled to the first gaseous oxygenation stage.

10. In a method for treating aqueous waste liquor for disposal by oxygenation on contact with activated sludge, the improvement comprising mixing waste liquor, activated sludge and feed gas comprising at least 90% oxygen (by volume) and simultaneously continuously recirculating one of such fluids against the other fluids in a first gaseous oxygenation stage to form first oxygenated liquid-solid having volatile suspended solids content (MLVSS) of at least 3000 p.p.m. and dissolved oxygen content (DO) of at least 0.5 p.p.m., and first unconsumed oxygen-containing gas comprising at least 55% oxygen; discharging said first unconsumed oxygen-containing gas and said first oxygenated liquid-solid from the first stage at flow-restricted rates and passing both to a second gaseous oxygenation stage; mixing the discharged first unconsumed oxygen-containing gas and the first oxygenated liquid-solid and simultaneously continuously recirculating one of such fluids against the other fluids in the second stage to form second oxygenated liquid-solid and second unconsumed oxygen-containing gas of lower oxygen purity than the first gas; discharging said second unconsumed oxygen-containing gas and said second oxygenated liquid-solid from the second stage at flow-restricted rates and passing both to a third gaseous oxygenation stage; mixing the discharged second unconsumed oxygen-containing gas and second oxygenated liquid-solid and simultaneously continuously recirculating one of such fluids against the other fluids in the third stage to form third oxygenated liquid-solid and third unconsumed oxygen-containing gas of lower oxygen purity than the second gas; discharging said third unconsumed oxygen-containing gas comprising more than 21% oxygen from said third stage at flow-restricted rate; discharging said third oxygenated liquid-solid at flow-restricted rate and separating same into purified liquid and concentrated solid; and recycling at least part of said concentrated solid to said first gaseous oxygenation stage as said activated sludge; flow-regulating the fluid streams and also regulating the mixing energy input to the three stages such that:

(a) the total contact time for liquid-solid for the three stages is between 20 and 180 minutes;

(b) at least 60% (by volume) of the oxygen in said feed gas is consumed in the liquid-solid of the three stages;

(c) between 0.10 and 0.30 lb.-moles per hour of oxygen are introduced to the first stage per one horsepower of mixing and gas-liquid contact energy used in the three stages; and (d) the volumetric flow ratio of feed gas to liquid in the first stage is between 0.08 and 2.0.

11. In a method for treating waste liquor for disposal by oxygenation in contact with activated sludge, the improvement comprising: mechanically mixing waste liquor, activated sludge and feed gas comprising at least 50% oxygen (by volume) and simultaneously continuously recirculating one of such fluids against the other fluids in a first gaseous oxygenation stage to form first oxygenated liquid-solid having volatile suspended solids content (MLVSS) of at least 3000 p.p.m. and first unconsumed oxygen-containing gas comprising at least 35% oxygen; discharging said first unconsumed oxygen-containing gas and said first oxygenated liquid-solid from the first stage at flow-restricted rates, and mechanically mixing both and simultaneously continuously recirculating one of such fluids against the other fluids in at least a second gaseous oxygenation stage to form a second oxygenated liquid-solid having volatile suspended solids content of at least 3000 p.p.m. and second unconsumed oxygen-containing gas comprising more than 21% oxygen but lower oxygen purity than said first unconsumed oxygen-containing gas; separating oxygenated liquid-solid from a higher-than-first gaseous oxygenation stage into purified liquid and activated sludge; recycling at least part of the activated sludge to the first gaseous oxygenation stage; and regulating the oxygenation stages so that each produces oxygenated liquid-solid of lower food content (BOD) than the immediately preceding stage and at least 60% (by volume) of the oxygen in said feed gas is consumed in the liquid-solid of all stages.

12. In a method for treating aqueous waste liquor for disposal by oxygenation in contact with activated sludge, the improvement comprising: mechanically mixing waste liquor, activated sludge and feed gas comprising at least 50% oxygen (by volume) and simultaneously continuously recirculating one of such fluids against the other fluids in a first gaseous oxygenation stage to form first oxygenated liquid-solid having suspended solids content (MLVSS) of at least 3000 p.p.m. and first unconsumed oxygen-containing gas comprising at least 35% oxygen; discharging said first unconsumed oxygen-containing gas from the first stage at flow restricted rate and mechanically mixing same in at least a second gaseous oxygenation stage with previously oxygenated liquid-solid having volatile suspended solids content of at least 3000 p.p.m. and simultaneously continuously recirculating one of the fluids against the other fluids to form further oxygenated liquid-solid and second unconsumed oxygen-containing gas comprising more than 21% oxygen but lower oxygen purity than said first unconsumed oxygen-containing gas; discharging said first oxygenated liquid-solid from the first stage at flow restricted rate, and mechanically mixing said first oxygenated liquid-solid with unconsumed oxygen-containing gas from a higher-than-first gaseous oxygenation stage and simultaneously continuously recirculating one of such fluids against the other fluids; separating oxygenated liquid-solid from a higher-than-first gaseous oxygenation stage into purified liquid and activated sludge; and regulating the gaseous oxygenation stages so that each produces oxygenated liquid-solid of lower food content (BOD) than the preceding stage and at least 60% (by volume) of the oxygen in said feed gas is consumed in the liquid-solid of all stages.

13. In a method for treating aqueous waste liquor for disposal by oxygenation in contact with activated sludge, the improvement comprising: mechanically mixing waste liquor, activated sludge and gas comprising at least 35% oxygen (by volume) in a gaseous oxygenation stage and simultaneously continuously recirculating one of such fluids against the other fluids to form first oxygenated liquid-solid having volatile suspended solids content (MLVSS) of at least 3000 p.p.m. and unconsumed oxygen-containing gas of lower oxygen purity than the gas mixed in such stage; discharging said first oxygenated liquid-solid and said unconsumed oxygen-containing gas at flow restricted rates, and cocurrently mechanically mixing same and simultaneously continuously recirculating one of such fluids against the other fluids in another gaseous oxygenation stage to form second oxygenated liquid-solids having lower food content (BOD) than said first oxygenated liquid-solid and further unconsumed oxygen-containing gas of lower oxygen purity than the gas mechanically mixed in said another stage; discharging said second oxygenated liquid-solid and said further unconsumed oxygen-containing gas at flow restricted rates, and cocurrently mechanically mixing same and simultaneously continuously recirculating one of such fluids against the other fluids in at least one additional gaseous oxygenation stage; mechanically mixing feed gas comprising at least 50% oxygen with oxygenated liquid-solid from a previous stage and simultaneously continuously recirculating one of such fluids against the other fluids in a final stage to form finally oxygenated liquid-solids having the first unconsumed oxygen-containing gas; discharging said first unconsumed oxygen-containing gas from said final stage and providing same as the gas comprising at least 35% oxygen for mechanically mixing with said waste liquor and activated sludge; regulating the oxygenation stages so that at least 60% (by volume) of the oxygen in said feed gas is consumed in the liquid-solid of all stages; and separating oxygenated liquid-solid from a higher-than-first oxygenation stage into purified liquid and activated sludge.

14. A method according to claim 9 wherein the oxygenated liquid-solid from a higher-than-first gaseous oxygenation stage prior to said last mixing stage is separated into supernatant liquid and sludge, and said sludge is transferred to the next succeeding gaseous oxygenation stage as the waste liquid-solid for mixing therein.

15. Apparatus for oxygenation of BOD-containing water comprising:
(a) a BOD-containing water storage enclosure;
(b) an oxygen gas source for supplying feed gas comprising at least 50% oxygen (by volume);
(c) at least two separate oxygenation chambers within said storage enclosure each having walls extending substantially to the floor of said storage enclosure and also extending above said BOD-containing water level, and covers over the upper ends to form gas spaces;
(d) conduit means between said oxygen gas source and one of said oxygenation chambers;
(e) means for introducing BOD-containing feed water to the one oxygenation chamber;
(f) means for mechanically mixing said oxygen gas with said BOD-containing feed water within the one oxygenation chamber to form first oxygenated liquid-solid;
(g) means separate from (f) for continuously recirculating a fluid in said one oxygenation chamber against other fluids therein;
(h) restricted passageway means for flow of unconsumed oxygen gas from the gas space of said one oxygenation chamber to a second oxygenation chamber;
(i) restricted flow means for transferring the first oxygenated liquid-solid to said second oxygenation chamber; and
(j) means for mechanically mixing said unconsumed oxygen gas with first oxygenated liquid-solid within said second oxygenation chamber to form second oxygenated liquid-solid; and
(k) separate means from (j) for continuously recirculating a fluid in said second oxygenation chamber against other fluids therein.

16. Apparatus according to claim 15 in which the two oxygenation chambers are contiguous to each other, and are separated by a common partition.

17. Apparatus according to claim 15 with at least three oxygenation chambers; restricted passageway means for flow of the unconsumed oxygen gas from the gas space of the second oxygenation chamber to a third oxygenation chamber; restricted flow means for transferring said second oxygenated liquid-solid from the second to said third oxygenation chamber; means for mechanically mixing such second unconsumed oxygen gas with said second oxygenated liquid-solid within the third oxygenation chamber; and separate means for continuously recirculating a fluid in said third oxygenation chamber against other fluids therein.

18. Apparatus according to claim 17 with means for withdrawing oxygenated liquid-solid from a higher-than-first oxygenation chamber; means for separating the withdrawn oxygenated liquid-solid into supernatant liquid and concentrated active biomass; and means for returning said biomass to the next higher oxygenation chamber as the oxygenated liquid-solid for mixing with unconsumed oxygen gas from said higher-than-first oxygenation chamber.

19. Apparatus for oxygenation of aqueous waste liquor comprising:
(a) a waste liquor storage tank;
(b) a gas-tight cover for said tank;
(c) four separate oxygenation chambers within said storage tank formed by the tank walls, cover and common partition respectively between the first and second chambers, the second and third chambers, and the third and fourth chambers, said common partitions each having upper ends extending above said waste liquor level and lower ends extending substantially to the storage tank floor;
(d) an oxygen gas source for supplying feed gas comprising at least 50% oxygen (by volume);
(e) conduit means between said oxygen gas source and the first chamber;
(f) means for introducing waste liquor to said first chamber;
(g) clarifier means for separating fourth chamber oxygenated liquid-solid into purified liquid and activated sludge;
(h) means for recycling activated sludge from said clarifier to said first chamber;
(i) blade means positioned beneath the waste liquor level for mechanically mixing said waste liquor, activated sludge, and oxygen gas in said first chamber to form first oxygenated liquid-solid;
(j) restricted flow opening means for passage of said first oxygenated liquid-solid to said second chamber;
(k) restricted passageway means between the first chamber gas space and said second chamber for flow of first chamber unconsumed oxygen gas to said second chamber;
(l) blade means positioned beneath the liquid-solid level for mechanically mixing said first chamber unconsumed oxygen gas and said first oxygenated liquid-solid in said second chamber to form second oxygenated liquid-solid;
(m) restricted flow opening means for passage of said second oxygenated liquid-solid to said third chamber;
(n) restricted passageway means between the second chamber gas space and said third chamber for flow of second chamber unconsumed oxygen gas to said third chamber;
(o) blade means positioned beneath the liquid-solid level for mechanically mixing said second chamber unconsumed oxygen gas and said second oxygenated liquid-solid in said third chamber to form third oxygenated liquid-solid;
(p) restricted flow opening means for passage of said third oxygenated liquid-solid to said fourth chamber;
(q) restricted passageway means between the third chamber for flow of third chamber unconsumed oxygen gas to said fourth chamber;
(r) blade means positioned beneath liquid-solid level for mechanically mixing said third chamber unconsumed oxygen gas and said third oxygenated liquid-solid in said fourth chamber to form fourth oxygenated liquid-solid;
(s) conduit means for transferring said fourth oxygenated liquid-solid to said clarifier means;
(t) conduit means for discharging purified liquid from said clarifier means; and
(u) fluid recirculation means for each of said four chambers each comprising a gas blower with its inlet side in gas flow communication with the chamber gas space, a gas sparger positioned beneath the liquid-solid surface and below said blade means, and a conduit joining the blower discharge side and the gas sparger.

20. A method according to claim 11 wherein gas is said fluid which is recirculated against liquid-solid in each gaseous oxygenation stage.

21. A method according to claim 11 wherein liquid-solid is said fluid which is recirculated against gas in each gaseous oxygenation stage.

22. Apparatus for oxygenation of BOD-containing water comprising:
(a) a BOD-containing water storage enclosure;
(b) an oxygen gas source for supplying feed gas comprising at least 50% oxygen (by volume);
(c) at least two separate oxygenation chambers within said storage enclosure each having wells extending substantially to the floor of said storage enclosure and also extending above said BOD-containing water level and covers over the upper ends to form gas spaces;
(d) conduit means between said oxygen gas source and one of said oxygenation chambers;
(e) means for introducing BOD-containing feed water to the one oxygenation chamber;
(f) a first rotatable impeller positioned at the surface of said BOD-containing feed water within the one oxygenation chamber for mixing and continuously recirculating said BOD-containing feed water against said oxygen gas to form first oxygenated liquid-solid;
(g) restricted passageway means for flow of unconsumed oxygen gas from the gas space of said one oxygenation chamber to a second oxygenation chamber;
(h) restricted flow means for transferring the first oxygenated liquid-solid to said second oxygenation chamber; and
(i) a second rotatable impeller positioned at the surface of said first oxygenated liquid-solid within said second oxygenation chamber for mixing and continuously recirculating said first oxygenated liquid-solid against said unconsumed oxygen gas to form second oxygenated liquid-solid.

23. Apparatus according to claim 15 wherein fluid recirculation means (g) and (k) each comprises a gas blower with its inlet side in gas flow communication with the chamber gas space, a gas sparger positioned beneath the liquid-solid surface in each chamber, and a conduit joining the blower discharge side and the gas sparger.

24. Apparatus according to claim 15 wherein fluid recirculation means (g) and (k) each comprises a rotatable impeller positioned at the liquid-solid surface in each chamber.

25. Apparatus according to claim 15 wherein mechanical mixing means (f) and (j) each comprises a multiplicity of blades positioned beneath the liquid-solid surface and joined to a rotatable shaft in each chamber, and fluid recirculation means (g) and (k) each comprises a gas blower with its inlet side in gas flow communication with the chamber gas space, a gas sparger positioned beneath the liquid-solid surface and below said blades in each chamber, and a conduit joining the blower discharge side and the gas sparger.

References Cited

UNITED STATES PATENTS

| | | | |
|---|---|---|---|
| 1,286,017 | 11/1918 | Jones | 210—15X |
| 2,380,465 | 7/1945 | Proudman | 210—220X |
| 2,948,677 | 8/1960 | Austin et al. | 210—15X |
| 3,054,602 | 9/1962 | Proudman | 210—15X |
| 3,133,017 | 5/1964 | Lambeth | 210—15X |
| 3,342,727 | 9/1967 | Bringle | 210—220X |
| 3,356,609 | 12/1967 | Bruemmer | 210—7 |
| 3,401,113 | 9/1968 | Pruessner et al. | 210—15X |
| 3,412,017 | 11/1968 | Abson et al. | 210—7 |
| 3,505,213 | 5/1970 | Anthony et al. | 210—15 |

(Other references on following page)

FOREIGN PATENTS 415,775  9/1934  Great Britain _____ 210—220

OTHER REFERENCES

Grant, S., et al.: The Oxygen Requirements of the Activated Sludge Process, Sewage Works Journal, vol. 2, April 1930, pp. 228-244.

Pfeffer, J. T., et al.: Oxygen-Enriched Air for Biological Waste Treatment, Water & Sewage Works, vol. 112, October 1965, pp. 381-384.

MICHAEL ROGERS, Primary Examiner

U.S. Cl. X.R.

210—15, 195, 220; 261—92, 125

UNITED STATES PATENT OFFICE
CERTIFICATE OF CORRECTION

Patent No. 3,547,815  Dated December 15, 1970

Inventor(s) John R. McWhirter

It is certified that error appears in the above-identified patent and that said Letters Patent are hereby corrected as shown below:

Disclosure

Column 1, line 41, before "oxygen" delete "large" and before "quality" insert -- large --.

Column 2, line 20, delete "become" and substitute -- because --; line 46, delete "techniuqes" and substitute -- techniques --; and line 56, delete "treatini" and substitute treating --.

Column 4, line 9, delete "into" and substitute -- in --; line 38, delete "state" and substitute -- stage --; and line delete "throught" and substitute -- through --.

Column 5, line 50, add -- s -- to "device" and line 64, delete "ane" and substitute -- and --.

Column 6, line 15, delete "oxygenated" (second occurrenc and substitute -- oxygenation --.

Column 7, line 24, delete "dirving" and substitute -- driving -- and line 40, after "28a-b" delete "." and substitu , --.

Column 8, line 22, delete "clairifier" and substitute -- clarifier --; line 42, delete "priviously" and substitute -- previously --; and line 64, delete "through put" and substitu throughput --.

-- cont'd.

UNITED STATES PATENT OFFICE
CERTIFICATE OF CORRECTION

Patent No. 3,547,815      Dated December 15, 1970

Inventor(s) John R. McWhirter

It is certified that error appears in the above-identified patent and that said Letters Patent are hereby corrected as shown below:

- Page 2 -

Column 9, line 4, delete "condits" and substitute -- conduits --; line 17, delete "countercurently" and substitute -- countercurrently --; line 19, delete "is" and substitute -- in --; line 32, add an -- s -- after "time"; and line 39, de "slude" and substitute -- sludge --.

Claims

Column 15, line 3, claim 1, delete "that" and substitute -- than --; line 34, claim 2, delete "that" and substitute -- than --; line 43, delete "statge" and substitute -- stage -- and line 69, claim 6, delete "The" and substitute -- A --.

Column 20, line 13, delete "wells" and substitute -- wal

Signed and sealed this 4th day of May 1971.

(SEAL)
Attest:

EDWARD M. FLETCHER, JR.
Attesting Officer

WILLIAM E. SCHUYLER, JR.
Commissioner of Patents